United States Patent
Xue et al.

(10) Patent No.: US 9,967,565 B2
(45) Date of Patent: May 8, 2018

(54) IMAGE COMPRESSION METHOD BASED ON LOCAL DYNAMIC QUANTIZING

(71) Applicant: PRIMESOM TECHNOLOGY (SHANGHAI) LIMITED, Shanghai (CN)

(72) Inventors: Yunbo Xue, Shanghai (CN); Xin He, Shanghai (CN); Jidong Huang, Shanghai (CN)

(73) Assignee: PRIMESOM TECHNOLOGY (SHANGHAI) LIMITED, Shanghai (CN)

(*) Notice: Subject to any disclaimer, the term of this patent is extended or adjusted under 35 U.S.C. 154(b) by 0 days. days.

(21) Appl. No.: 15/371,724

(22) Filed: Dec. 7, 2016

(65) Prior Publication Data

US 2018/0084252 A1   Mar. 22, 2018

(30) Foreign Application Priority Data

Sep. 19, 2016  (CN) .......................... 2016 1 0832922

(51) Int. Cl.
*H04N 19/124* (2014.01)
*H04N 19/176* (2014.01)
*H04N 19/186* (2014.01)

(52) U.S. Cl.
CPC ......... *H04N 19/124* (2014.11); *H04N 19/176* (2014.11); *H04N 19/186* (2014.11)

(58) Field of Classification Search
None
See application file for complete search history.

(56) References Cited

U.S. PATENT DOCUMENTS

| | | | | |
|---|---|---|---|---|
| 5,307,177 A | * | 4/1994 | Shibata | H04N 19/98 358/426.03 |
| 6,792,157 B1 | * | 9/2004 | Koshi | H04N 19/46 341/106 |
| 2002/0015528 A1 | * | 2/2002 | Kondo | H04N 19/89 382/224 |
| 2006/0188012 A1 | * | 8/2006 | Kondo | G11B 20/00086 375/240.2 |
| 2007/0223824 A1 | * | 9/2007 | Kato | H04N 5/335 382/232 |

(Continued)

*Primary Examiner* — Bernard Krasnic
(74) *Attorney, Agent, or Firm* — Tim Tingkang Xia, Esq.; Locke Lord LLP

(57) ABSTRACT

One aspect of the present invention discloses an image compression method based on local dynamic quantization. The method includes the following steps: (1) obtaining an image in a raw format, and parsing information about the obtained image; (2) performing image block partitioning on raw data collected from the image; (3) obtaining statistics of pixel values of the image blocks; (4) calculating a quantization step; (5) calculating an offset of each pixel; (6) performing quantization by: performing a division operation on the relative amplitude of each pixel of the current image block and the quantization step; and establishing a new gray-scale value; (7) reconstructing a block-based data structure; and (8) outputting a file. By the method, information of the raw data can be maintained to the greatest extent, and a data storage volume also can be reduced to meet the requirements on data recovery and reediting.

4 Claims, 3 Drawing Sheets

(56) References Cited

U.S. PATENT DOCUMENTS

| | | | |
|---|---|---|---|
| 2008/0291295 A1* | 11/2008 | Kato .................... | H04N 19/124 348/231.99 |
| 2013/0128975 A1* | 5/2013 | Gupte .................. | H04N 19/593 375/240.16 |
| 2014/0079337 A1* | 3/2014 | Kondo ................... | G06T 3/40 382/276 |
| 2015/0245039 A1* | 8/2015 | Kondo ................... | H04N 19/94 375/240.24 |

* cited by examiner

| Dpxl 0,0 | Dpxl 0,1 | Dpxl 0,2 | Dpxl 0,3 | ... | Dpxl 0,m |
|---|---|---|---|---|---|
| Dpxl 1,0 | DLT | Dpxl 1,2 | Dpxl 1,3 | ... | Dpxl 1,m |
| Dpxl 2,0 | Dpxl 2,1 | Dpxl 2,2 | Dpxl 2,3 | ... | Dpxl 2,m |
| Dpxl 3,0 | Dpxl 3,1 | 0 | Dpxl 3,3 | ... | Dpxl 3,m |
| ... | ... | ... | ... | ... | ... |
| Dpxl n,0 | Dpxl n,1 | Dpxl n,2 | Dpxl n,3 | ... | Dpxl n,m |

FIG. 4

| Vmax 12bits | Vmax_c 4bits | Vmin 12bits | Vmin_c 4bits | V' 6bits | V' 6bits | V' 6bits | V' 6bits | ... | V' n*m-2 6bits |
|---|---|---|---|---|---|---|---|---|---|

FIG. 5

IMAGE COMPRESSION METHOD BASED ON LOCAL DYNAMIC QUANTIZING

CROSS-REFERENCE TO RELATED APPLICATION

This non-provisional application claims priority under 35 U.S.C. § 119(a) to Chinese Patent Application No. CN 201610832922.8, filed Sep. 19, 2016, in the State Intellectual Property Office of P.R. China, which is hereby incorporated herein in its entirety by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE INVENTION

The present invention relates to the field of digital image processing technologies, and in particular, to an image compression method based on local dynamic quantization.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the present invention.

With development of image sensor (cmos) technologies, image collection using high-pixel high-profile cameras has gradually become widespread. In an actual application, a camera with a higher number of pixels indicates better image quality and a stronger capability of parsing an image. However, a required data record volume also becomes much relatively larger. Therefore, requirements on storage devices and bandwidth requirements on signal processing also become much higher. In this case, a great challenge is brought to storage, transmission, and processing of images. Currently, the pixel number of a mainstream cmos sensor have reached 1600 w pixels, and the pixel number of a single-lens reflex camera may be greater. By recording data in a raw format, the raw record of a single image having 1600 w pixels and a bit width of each pixel being 14 bits may reach 224000000 data bits, i.e., 28000000 bytes, and the data volume of a 30-frame per second may be 8400,000,000 bytes. However, a current data transmission rate in a mainstream recording device is below 500 M, which cannot meet the normal storage requirements.

Currently, a commonly used means in the industry adopts the manner of image and video compression by combining software and hardware, such that image storage pressure may be relieved. However, in this manner, color space conversion is first performed on sensor data in the raw format, and then lossy compression and encoding are performed according to visual characteristics and patterns of human eyes, and spatial and time characteristics of the image or video, so as to reduce an actual data storage volume. However, commonly used compression manners all have limitations.

For example, image compression manners, such as jpg and png, have high compression efficiency. However, due to the frequency domain conversion that is used, a loss of low-frequency information is relatively large, leaving less of the reserved information about raw data of the image, which does not facilitate recovery of raw data.

For the jpeg2000 lossless compression manner, the implementation manner is complex, and software operation efficiency is low, which is not suitable for continuous collection of images.

Further, for common video compression encoding (h264/mpeg), multiple compression algorithms are used in a space domain and time domain to implement real-time video image compression. However, a loss of image information is relative large, which is not suitable for recovery of raw data. Moreover, hardware costs are excessively high.

Therefore, a heretofore unaddressed need exists in the art to address the aforementioned deficiencies and inadequacies.

SUMMARY OF THE INVENTION

For disadvantages in the prior art, a technical problem to be resolved by the present invention is to provide an image compression method based on local dynamic quantization.

Aspects of the present invention provides a method for compressing a raw sensor data that is based on a raw format, so as to maintain information of the raw data to the greatest extent, and reduce a data storage volume to meet requirements on data recovery and reediting. Moreover, the method is simple, and hardware implementation costs are low, so as to meet the storage conditions of mainstream storage devices.

In one aspect, a technical solution used by the present invention to resolve the technical problem of the present invention is: an image compression method based on local dynamic quantization, including the following steps:

(1) obtaining, by one or more processors, an image in a raw format from an image resource, and parsing information of the obtained image, wherein the information comprises: a width, a height and a size of the image, a gray-scale bit number of pixels of the image, and a color space of the image;

(2) performing, by the one or more processors, image block partitioning on raw data collected from the image by green (G), red (R) and blue (B) channels, by: dividing the image into divisions of 2*n rows and 2*m columns, and performing color channel separation on each of the (2*n)*(2*m) divisions to form four (n*m) image blocks, wherein each of the four (n*m) image blocks is marked as Bi, and wherein two of the four (n*m) image blocks are on the green channel, one of the four (n*m) image blocks is on the red channel, and one of the four (n*m) image blocks is on the blue channel; each pixel is represented by 12 bits; therefore, a binary record bit number of one of the (n*m) image blocks is (12*n*m);

(3) obtaining, by the one or more processors, statistics of pixel values of the image blocks by: obtaining statistics of a maximum value and a minimum value of a current one of the four (n*m) image blocks Bi; recording coordinate locations of the maximum value and the minimum value in the current (n*m) image block; and calculating a range (extremum difference) of the current (n*m) image block;

obtaining the maximum value Gmax of the current (n*m) image block Bi, wherein the maximum value Gmax is represented as Vmax;

obtaining a minimum value of the current (n*m) image block Bi, wherein the minimum value is represented as Vmin; and obtaining the range (extremum difference) TDi of the current (n*m) image block Bi, where:

$$TDi = V\max - V\min;$$

such that TDi reflects a pixel conversion range of the current (n*m) image block Bi;

(4) calculating a quantization step by:

performing a division operation on the extremum difference of the current (n*m) image block Bi and a target quantization gray-scale value to obtain the quantization step, wherein the target quantization gray-scale value is a re-quantization level QL, and QL denotes a quantized data space size, is directly represented as a bit number required for data storage to determine a file size to be stored and a bandwidth required in transmission;

(5) calculating an offset of each of the pixels by:

obtaining, for the current (n*m) image block Bi, a difference between data of each pixel and the minimum value Vmin of the (n*m) image block Bi, to obtain a difference of each pixel, where the difference of each pixel represents a relative amplitude of each pixel;

(6) performing quantization by:

performing a division operation on the relative amplitude (a deviation) of each pixel of the current (n*m) image block and the quantization step; and establishing a new gray-scale value;

(7) reconstructing, by the one or more processors, a block-based data structure by:

establishing an array for the current (n*m) image block, and sequentially recording, from left to right and from top to bottom, the maximum value, coordinates of the maximum value, the minimum value, coordinates of the minimum value, and remaining pixels; and (8) outputting a file by:

writing a current processing result to an output image buffer;

(9) performing a column ending determination by:

determining whether processing on pixel blocks in a current row is completed;

if the processing on the pixel blocks in the current row is completed, proceeding to step (10), to perform a row processing determination; and if the processing on the pixel blocks in the current row is not completed, returning to step (2), to perform an operation on a next column;

(10) performing the row processing determination by:

determining whether all row processing of the image is completed;

if the row processing is completed, proceeding to step (11), to complete processing on the current image; and if the row processing is not completed, returning to step (2), to perform an operation on a next row; and

(11) completing the processings, and ending the operations.

Advantageous Effects Generated by the Present Invention are:

1. the method is simple, and does not depend on participation of a CPU; when a parameter is determined, data can be completely processed by hardware;

2. operations are simple, and are suitable for hardware implementation; and 3. image block operations are performed, meeting quick analyzing and processing on local information of an image; details of the image are reserved, which facilitates implementation of the image processing procedures.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

FIG. 4 is a schematic diagram of calculating a deviation of a pixel value of an image block according to an embodiment of the present invention; and FIG. 5 is a schematic diagram of a data structure according to an embodiment of the present invention.

DETAILED DESCRIPTION OF THE INVENTION

Figure 1:
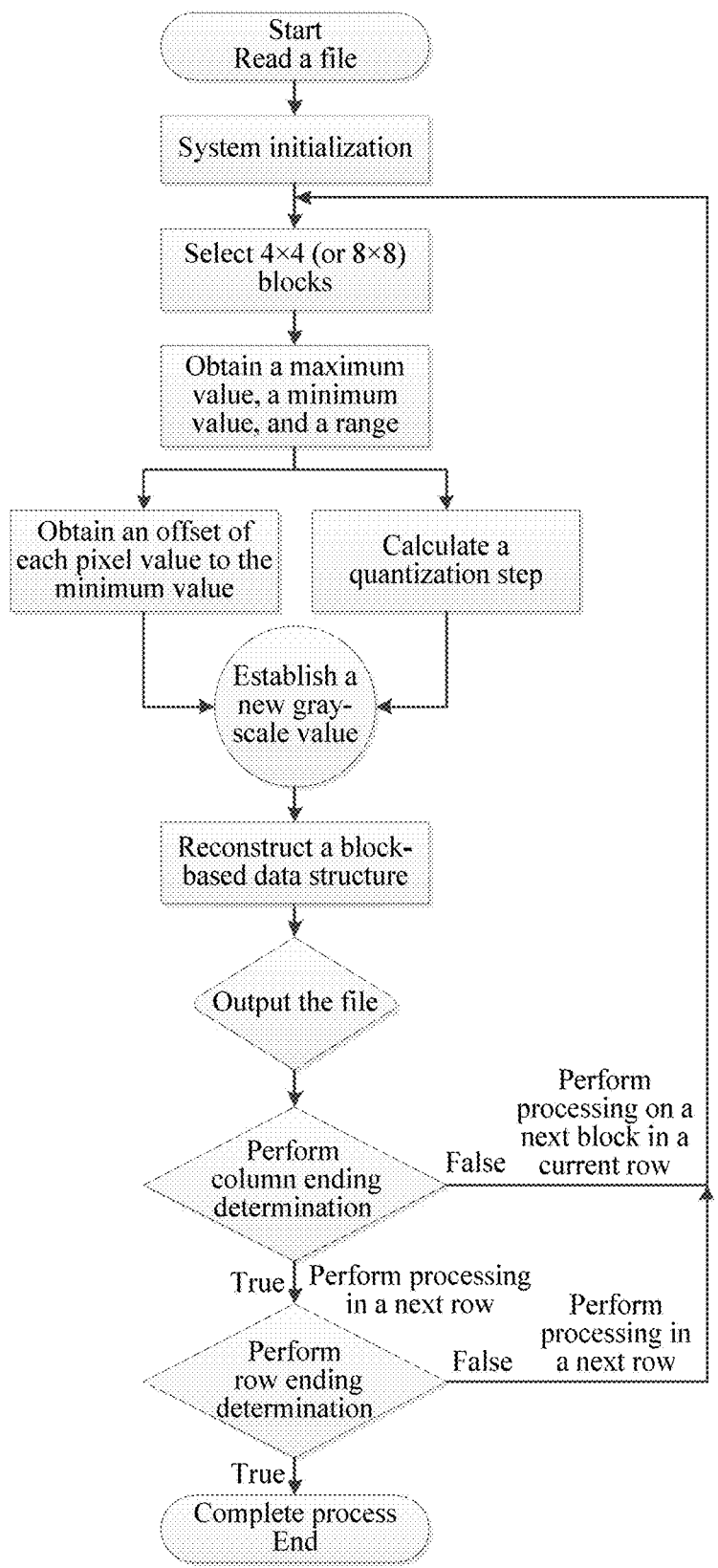
FIG. 1 is a flowchart of a method according to an embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

The present invention relates to computer systems. In certain embodiments, computer components may include physical hardware components and virtual software components. One of ordinary skill in the art would appreciate that, unless otherwise indicated, these computer components may be implemented in, but not limited to, the forms of software, firmware or hardware components, or a combination thereof.

To make the objectives, technical solutions, and advantages of the present invention clearer, the following further describes the embodiments of the present invention in detail with reference to the embodiments. It should be understood that the specific embodiments described herein are merely used to explain the present invention, and are not intend to limit the present invention.

Pixel values in adjacent areas of an image are distributed in gray-scale space in a relatively centralized manner. Therefore, it may be assumed that a gray-scale change of the image is continuous in an area, and a gray-scale range (an extremum difference) is less than a gray-scale range (the extremum difference) of the entire image. Theoretically, in this way, a smaller bit number may be used to describe a gray scale in the area, thereby reducing the bit numbers used to represent a gray-scale value, and implementing data compression.

Figures 2, 3:
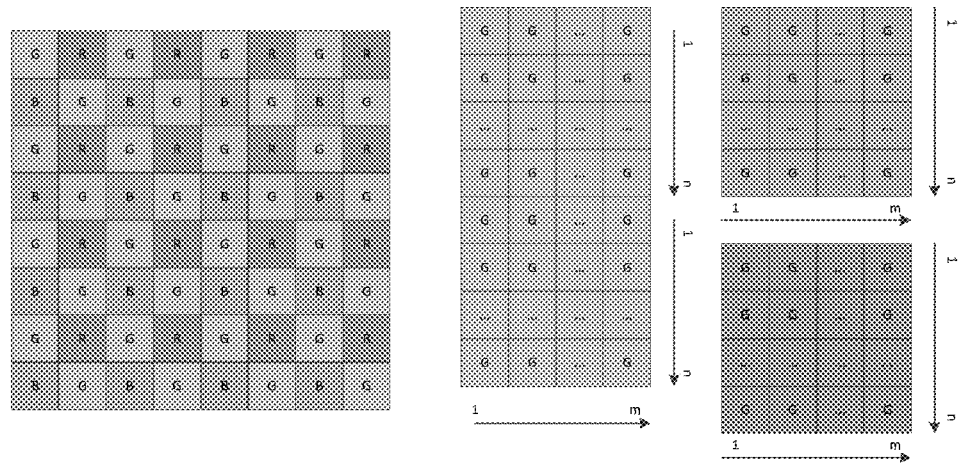
FIG. 2 is a schematic diagram of image block partitioning according to an embodiment of the present invention.
FIG. 3 is a schematic diagram of obtaining statistics of pixel values of the image blocks according to an embodiment of the present invention.

As shown in FIG. 1, 1. read a file, and obtain an image from an image source (a memory, a buffer, a magnetic disk, or the like); obtain information of the obtained image, where the information comprises: a width, a height and a size of the image, a gray-scale bit number of pixels of the image, a color space of the image, and the like;

2. system initialization; establishing an image buffer space according to the information of the image; establishing a block operation buffer; establishing an output file buffer; initializing various variables, pointers, and the like;

3. perform image block partitioning by: performing image block partitioning on raw data collected from the image by green (G), red (R) and blue (B) channels, by: dividing the image into divisions of 2*n rows and 2*m columns, and performing color channel separation on each of the (2*n)* (2*m) divisions to form four (n*m) image blocks, where each of the four (n*m) image blocks is marked as Bi, and wherein two of the four (n*m) image blocks are on the green channel, one of the four (n*m) image blocks is on the red channel, and one of the four (n*m) image blocks is on the blue channel; each pixel is represented by 12 bits; therefore, a binary record bit number of one of the (n*m) image blocks is (12*n*m);

assuming that n and m are 4, the raw record data of each block has 16*12=192 bits;

assuming that n and m are 8, the raw record data of each block has 64*12=768 bits;

in an implementation process of the present embodiment, 4×4 image block partitioning and 64 level magnitude space re-quantization are used herein; and in actual implementation, an operation of 8×8 image block partitioning or 128 level magnitude space re-quantization may be implemented according to an actual application range; and obtaining the 4×4 image blocks, as shown in FIG. 2;

4. obtain statistics of pixel values of the image blocks by: obtaining statistics of a maximum value and a minimum value of a current block Bi; recording coordinate locations (which are represented by 4 bits, and x and y coordinates are separately represented by 2 bits) of the maximum value and the minimum value in the current block; and calculating an extremum difference of the current (n*m) image block;

as shown in FIG. 3, obtaining a maximum value Gmax of a single Bi, where the maximum value Gmax is represented as Vmax; obtaining a minimum value of the single Bi, where the minimum value is represented as Vmin; and obtaining the extremum difference TDi of the current (n*m) image block Bi, where $$TDi = Vmax - Vmin,$$

such that TDi reflects a pixel conversion range of the current block Bi;

obtaining maximum and minimum data of the current Bi, and obtaining a difference of the maximum and minimum values;

5. calculate a quantization step by:

performing a division operation on the extremum difference and a target quantization gray-scale value (which is 64 herein), to obtain the quantization step (step);

6. calculate an offset of each pixel by:

obtaining a difference between data of each pixel and the minimum value Vmin of the (n*m) image block Bi, to obtain a difference Dpxl(n,m) of each pixel, which is represented as D(n,m), as shown in FIG. 4, that is, a relative amplitude of the pixel;

7. perform quantization by:

performing a division operation on the relative amplitude (a deviation) of each pixel of the current block and the quantization step; and establish a new gray-scale value;

8. reconstruct a block-based data structure by:

according to a data structure shown in FIG. 5, sequentially recording, from left to right and from top to bottom, the maximum value, coordinates of the maximum value, the minimum value, coordinates of the minimum value, and remaining pixels;

9. output a file by:

writing a current processing result to an output image buffer;

10. perform a column ending determination by:

determining whether processing on pixel blocks in a current row is completed;

true: if the processing on the pixel blocks in the current row is completed, proceeding to the next step 11, to perform a row processing determination; and false: if the processing on a current row is not completed, returning to step 3, to perform an operation on a next column;

11. perform the row processing determination by:

determining whether all row processing of the image is completed;

true: if the row processing is completed, proceeding to the next step 12, to complete processing on the current image; and false: if the row processing is not completed, returning to step 3, to perform an operation on a next row; and 12. complete the processings, and end the operations.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments are chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An image compression method based on local dynamic quantization, comprising the following steps:

(1) obtaining, by one or more processors, an image in a raw format from an image resource, and parsing information of the obtained image, wherein the information comprises: a width, a height and a size of the image, a gray-scale bit number of pixels of the image, and a color space of the image;

(2) performing, by the one or more processors, image block partitioning on raw data collected from the image by green (G), red (R) and blue (B) channels, by: dividing the image into divisions of 2*n rows and 2*m columns, and performing color channel separation on each of the (2*n)*(2*m) divisions to form four (n*m) image blocks, wherein each of the four (n*m) image blocks is marked as Bi, and wherein two of the four (n*m) image blocks are on the green channel, one of the four (n*m) image blocks is on the red channel, and one of the four (n*m) image blocks is on the blue channel, wherein n and m are positive integers;

(3) obtaining, by the one or more processors, statistics of pixel values of the image blocks by: obtaining statistics of a maximum value and a minimum value of a current one of the four (n*m) image blocks Bi; recording coordinate locations of the maximum value and the minimum value in the current (n*m) image block; and calculating an extremum difference of the current (n*m) image block using the maximum value and the minimum value of the current (n*m) image block;

(4) calculating a quantization step by:

performing a division operation on the extremum difference of the current (n*m) image block Bi and a target quantization gray-scale value to obtain the quantization step, wherein the target quantization gray-scale value is a re-quantization level QL, and QL denotes a quantized data space size, is directly represented as a bit number required for data storage to determine a file size to be stored and a bandwidth required in transmission;

(5) calculating an offset of each of the pixels by:

obtaining, for the current (n*m) image block Bi, a difference between data of each pixel and the minimum value Vmin of the (n*m) image block Bi, to obtain a difference of each pixel, wherein the difference of each pixel represents a relative amplitude of each pixel;

(6) performing quantization by:

performing a division operation on the relative amplitude of each pixel of the current (n*m) image block and the quantization step; and establishing a new gray-scale value;

(7) reconstructing, by the one or more processors, a block-based data structure by:

establishing an array for the current (n*m) image block, and sequentially recording, from left to right and from top to bottom, the maximum value, coordinates of the maximum value, the minimum value, coordinates of the minimum value, and remaining pixels; and (8) outputting a file by:

writing a current processing result to an output image buffer.

2. The method according to claim 1, wherein each pixel in step (2) is represented by 12 bits, and a binary record bit number of one of the (n*m) image blocks is (12*n*m).

3. The method according to claim 1, wherein the extremum difference of the current (n*m) image block in step (3) is calculated by:

obtaining the maximum value Gmax of the current (n*m) image block Bi, wherein the maximum value Gmax is represented as Vmax;

obtaining a minimum value of the current (n*m) image block Bi, wherein the minimum value is represented as Vmin; and obtaining the extremum difference TDi of the current (n*m) image block Bi, wherein:

$$TDi = Vmax - Vmin;$$

such that TDi reflects a pixel conversion range of the current (n*m) image block Bi.

4. The method according to claim 1, wherein the method further comprises the following steps:

(9) performing a column ending determination by:

determining whether processing on pixel blocks in a current row is completed;

if the processing on the pixel blocks in the current row is completed, proceeding to step (10), to perform a row processing determination; and if the processing on the pixel blocks in the current row is not completed, returning to step (2), to perform an operation on a next column;

(10) performing the row processing determination by:

determining whether all row processing of the image is completed;

if the row processing is completed, proceeding to step (11), to complete processing on the current image; and if the row processing is not completed, returning to step (2), to perform an operation on a next row; and

(11) completing the processings, and ending the operations.

\* \* \* \* \*